(12) United States Patent
McGurran et al.

(10) Patent No.: US 6,811,867 B1
(45) Date of Patent: Nov. 2, 2004

(54) COLOR STABLE PIGMENTED POLYMERIC FILMS

(75) Inventors: Daniel J. McGurran, Woodbury, MN (US); Robert L. Brott, Woodbury, MN (US); James A. Olson, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 219 days.

(21) Appl. No.: 09/633,911

(22) Filed: Aug. 8, 2000

Related U.S. Application Data

(63) Continuation-in-part of application No. 09/503,597, filed on Feb. 10, 2000, now abandoned.

(51) Int. Cl.[7] .......................... B32B 27/18; B32B 27/20; B32B 27/36
(52) U.S. Cl. ....................... 428/323; 428/328; 428/329; 428/330; 428/331; 428/480; 359/885
(58) Field of Search .................................. 428/323, 328, 428/329, 330, 480, 141, 910, 331; 359/885

(56) References Cited

U.S. PATENT DOCUMENTS

| | | |
|---|---|---|
| 3,830,773 A | 8/1974 | Barkey et al. |
| 4,408,004 A | 10/1983 | Pengilly |
| 4,476,272 A | 10/1984 | Pengilly |
| 4,535,118 A | 8/1985 | Pengilly |
| 4,546,036 A | 10/1985 | Renalls et al. |
| 4,603,073 A | 7/1986 | Renalls et al. |
| 4,737,559 A | 4/1988 | Kellen et al. |
| 4,751,118 A * | 6/1988 | Wypart et al. ................ 428/35 |
| 4,865,898 A | 9/1989 | Fukuda et al. |
| 5,262,470 A | 11/1993 | Shimotsuma et al. |
| 6,049,419 A * | 4/2000 | Wheatley .................... 359/359 |
| 6,368,699 B1 * | 4/2002 | Gilbert et al. .............. 428/212 |
| 6,569,517 B1 * | 5/2003 | McGurran et al. .......... 428/323 |
| 2003/0017326 A1 * | 1/2003 | McGurran et al. .......... 428/323 |

FOREIGN PATENT DOCUMENTS

| | | |
|---|---|---|
| EP | 0 459 967 | 4/1991 |
| EP | 0 894 620 | 3/1999 |
| JP | 56016546 | 2/1981 |
| JP | 58164623 | 9/1983 |
| JP | 58168526 | 10/1983 |
| JP | 11116826 | 4/1999 |
| JP | 2000143842 | 5/2000 |
| WO | WO 95/17303 | 6/1995 |
| WO | WO 95/17699 | 6/1995 |
| WO | WO 96/19347 | 6/1996 |
| WO | WO 97/01440 | 1/1997 |
| WO | WO 97/01774 | 1/1997 |
| WO | WO 97/32226 | 9/1997 |
| WO | WO 99/36248 | 7/1999 |
| WO | WO 99/36262 | 7/1999 |

* cited by examiner

*Primary Examiner*—Vivian Chen

(57) ABSTRACT

Color-stable, pigmented optical bodies comprising a single or multiple layer core having at least one layer of a thermoplastic polymer material. The thermoplastic polymer material has dispersed within it a particulate pigment. The optical bodies generally possess high clarity and low haze and exhibit a transmission of light within a wavelength band of interest within the visible spectrum of from about 10 to about 90 percent.

29 Claims, 2 Drawing Sheets

COLOR STABLE PIGMENTED POLYMERIC FILMS

CROSS REFERENCE TO RELATED APPLICATIONS

This is a continuation-in-part of U.S. application Ser. No. 09/503,597, filed Feb. 10, 2000, now abandoned.

FIELD OF THE INVENTION

The present invention relates to color-stable polymeric films and products made therefrom. More particularly, the present invention relates to color-stable pigmented polymeric films made of a polyester.

BACKGROUND OF THE INVENTION

Tinted polymeric films, and particularly tinted polymeric films made of a polyester, find utility in a broad range of applications. These films, for example, can be applied to a base transparent substrate (e.g., a window or auto glass pane) to provide a neutral color tint to the window or auto glass. They can also used to tint the surface of a display device, mirror, or other piece of optical equipment.

One method for tinting a polymeric base film employs dyeing the base film with one or more color dyes. Typically in such methods, the neutral color, or "tint," is obtained by imbibing (or blending) the base film material with a combination of yellow, red and blue dyes. While these dyed films generally retain a high clarity and a low haze, prolonged exposure to ultraviolet radiation (which occurs naturally during outdoor use or by exposure to fluorescent light or other UV-emitting light source) can cause significant degradation of the dye molecules and lead to tinting color alteration, tinting power deterioration, bleachings, and reduced light transmission.

Another method sometimes employed for tinting a polymeric film is to apply a pigmented coating to the surface of a base polymeric film. Generally, such coatings are applied as thin layers and employ a relatively high pigment concentration to achieve a desired tint level. These highly-concentrated pigment coatings can suffer myriad processing and performance drawbacks. For example, the high pigment concentrations necessary to achieve requisite tinting strengths are difficult to uniformly disperse within the thin coating, and these high surface pigment concentrations generally suffer faster environmental deterioration. Moreover, such pigmented coatings typically suffer greater haze and reduced clarity.

There exists, therefore, a need for a pigmented film that is environmentally stable (i.e., color-stable or colorfast), that is easily manufactured and that exhibits low haze and high clarity.

SUMMARY OF THE INVENTION

Briefly, in one aspect, the present invention provides a color-stable, pigmented optical body, the optical body comprising: a single or multiple layer core comprising at least one layer of a thermoplastic polymer material having dispersed therein a particulate pigment, wherein the optical body exhibits a transmission of light within a wavelength band of interest within the visible spectrum of from about 10 to about 90 percent and exhibits less than or equal to about five percent internal haze.

In one aspect, the present invention provides a color-stable, pigmented optical body, the optical body comprising: a single or multiple layer core comprising at least one layer of a thermoplastic polymer material having dispersed therein a particulate pigment, wherein the optical body exhibits an average transmission of light within the visible spectrum of from about 10 to about 90 percent and exhibits an internal haze of less than or equal to about five percent.

In yet another aspect, the invention provides a color-stable, pigmented optical body comprising a single or multiple layer core comprising at least one layer of a thermoplastic polymer material, wherein dispersed within the thermoplastic polymer material is between 0.01 and about 1.0 percent by weight of a particulate pigment having a mean diameter of between about 10 nm and 500 nm, and wherein the optical body exhibits a transmission of light within a wavelength band of interest within the visible spectrum of from about 10 to about 90 percent.

In still another aspect, the invention provides a color-stable, pigmented optical body comprising a single or multiple layer core comprising at least one layer of a thermoplastic polymer material having dispersed therein a particulate pigment, wherein the optical body has a surface roughness, $R_a$, of less than or equal to about 60 and exhibits a transmission of light within a wavelength band of interest within the visible spectrum of from about 10 to about 90 percent.

The invention also provides a method of making a color-stable, pigmented optical body, the method comprising:

(a) creating a substantially uniform dispersion of a particulate pigment having a mean diameter of between about 10 nm and about 500 nm;

(b) adding the dispersion to a reaction mass of a condensation polymer forming process, wherein the dispersion is present in an amount sufficient to impart a transparency to the optical body between about 10 and 90 percent;

(c) reacting the condensation polymer forming reaction mass to form a condensation polymer having dispersed therein the particulate pigment; and (d) forming an optical body comprising at least one layer of the condensation polymer.

In still other aspects, the present invention provides articles, including pigmented window and auto glass films, that incorporate the above color-stable optical bodies.

DETAILED DESCRIPTION OF PREFERRED EMBODIMENTS

Figure 1:
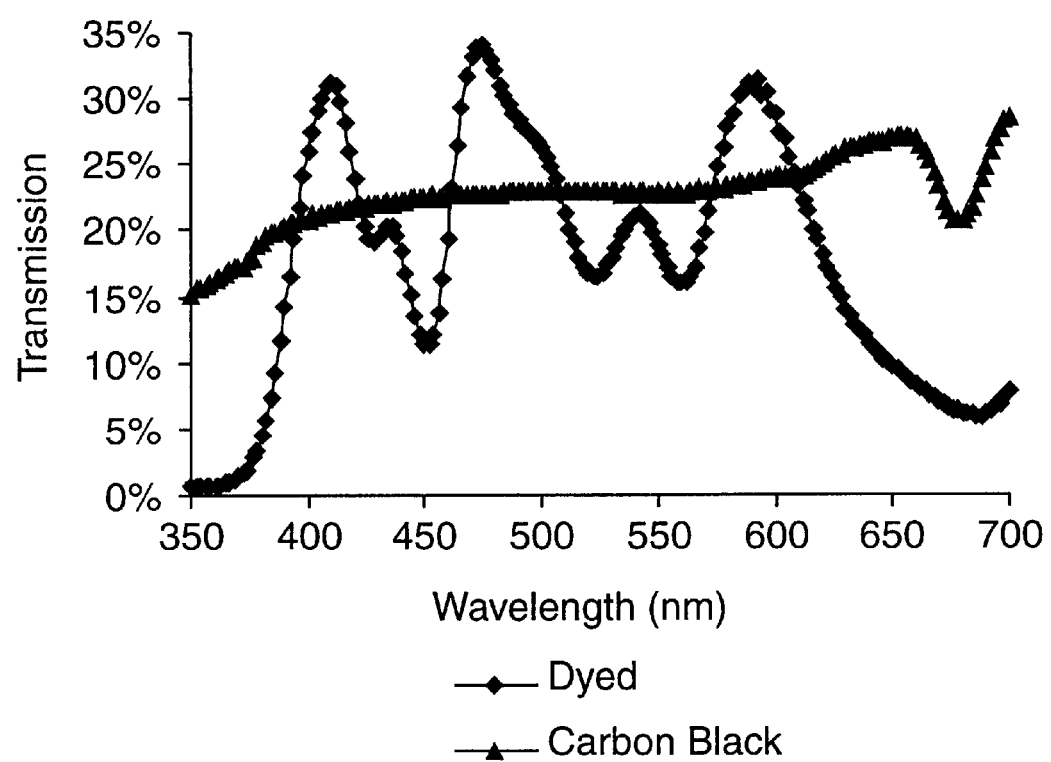
FIG. 1 is a transmission spectra, showing the percent transmission as a function of wavelength across the visible spectrum, for a polyester (PET) optical body pigmented with a particulate pigment (carbon black) according to the invention and a conventional dyed polyester film.

The optical bodies of the invention generally comprise a base polymeric core into which there is uniformly dispersed a particulate pigment having a selected mean diameter. The optical bodies are generally constructed such that the transmission of the body within a desired portion of the visible spectrum (i.e., between about 400 nm and about 700 nm) can be controlled from 10 to 90 percent while simultaneously exhibiting a low degree of haze. In some embodiments, at least one additional transparent layer is disposed on at least one outer surface of the core body and is substantially free of the particulate pigment material. This additional layer is sometimes referred to as a "skin" layer. The base polymeric core comprises at least one oriented or non-oriented thermoplastic pigmented material, generally, but not necessarily, in the form of a film. In its entirety the core can be comprised of one, several or many individual layers. In some embodiments, the core body is a multi-layer optical film.

The core of the optical body can incorporate any thermoplastic polymer material, including any polyester-containing polymer. Useful polyester polymers include polymers having terephthalate or naphthalate comonomer units, for example, polyethylene naphthalate (PEN), polyethylene terephthalate (PET) and copolymers and blends thereof. Examples of other suitable polyester copolymers are provided in, for example, published patent application WO 99/36262 and in WO 99/36248, both of which are incorporated herein by reference. Other suitable polyester materials include polycarbonates, polyarylates, and other naphthalate and terephthalate-containing polymers, such as, for example, polybutylene naphthalate (PBN), polypropylene naphthalate (PPN), polybutylene terephthalate (PBT) and polypropylene terephthalate (PPT), and blends and copolymers of any of the above with each other or with non-polyester polymers.

The optical body core can also include or be comprised of a multi-layer optical film. Generally speaking, multi-layer optical films are used to create optical interference filters that reflect light via designed constructive interferences between a multiplicity of layers with alternating low and high indices of refraction. Such films can be composed of either isotropic or birefringement layers, or both. Birefringent optical films are constructed in multi-layer "stacks" for which the Brewster angle (the angle at which reflectance of p-polarized light goes to zero) is controlled to a desired value by control of the relative values of the various indices of refraction in the layers. This property allows for the construction of multilayer mirrors and polarizers whose reflectivity for p-polarized light decreases slowly with angle of incidence, are independent of angle of incidence, or that increases with angle of incidence away from the normal. As a result, multilayer films having high reflectivity (for both s- and p-polarized light for any incident direction in the case of mirrors, and for the selected polarization in the case of polarizers) over a wide bandwidth, can be achieved.

Useful multilayer constructions are disclosed, for example, in the following published patent applications, all of whose descriptions are incorporated herein by reference: WO 95/17303, WO 96/19347, and WO 97/01440. Among the most useful films are multi-layer constructions made of alternating thin layers of PEN and a co-polymer of PEN, for example a 70-naphthalate/30-terephthalate co-polyester (co-PEN), or other polymers having a lower refractive index than PEN.

Often, the ability to achieve properties desired in a single or multi-layer polymeric body is influenced by the processing conditions used to prepare it. The polymeric optical body, for example, can be formed by a casting process wherein a molten polymer composition is extruded through a die and cast as a film upon a cooled casting wheel. The desired casting thickness of the cast film will depend in part on the desired use for the optical body, and may be achieved by control of the process conditions under which the body is formed. Typical casting thicknesses range from about 0.3 mm to as much as 3.0 mm, though, depending on the particular end use, thinner or thicker castings can be made.

A cast polymeric body can optionally be oriented, again depending on the particular set of properties desired. Typically, an oriented body is oriented after a quenching process in either or both the lengthwise (sometimes referred to as machine) direction and the transverse (or cross-machine) direction. Although the degree of orientation in either direction can vary greatly (and are not necessarily the same), typically stretching dimensions vary between 2.5 and 5.0 times the body's cast dimensions. A cast polymeric body can also be heated before or during orientation, e.g., by infrared lamps or forced convection, to raise its temperature to slightly above its glass transition temperature.

When multi-layer optical films are employed, for example, it may be necessary to achieve given relationships among the various indices of refraction (and thus the optical properties) of the multilayer device. In the case of organic polymer films, these properties can be obtained and/or controlled by stretching or orientation. Generally, this is accomplished by preparing the polymer films by co-extruding the individual polymers to form a multilayer film and then orienting the film by stretching at a selected temperature, optionally followed by heat-setting at a selected temperature. Alternatively, the extrusion and orientation steps may be performed simultaneously. In the case of multilayer optical bodies in the form of a polarizer, the multilayer film typically is stretched substantially in one direction (uniaxial orientation). In the case of multilayer optical bodies in the form of a mirror, the film is stretched substantially in two directions (biaxial orientation).

When stretched, the core polymeric body may also be allowed to dimensionally relax in the cross-stretch direction from the natural reduction in cross-stretch (equal to the square root of the stretch ratio) or may also be constrained (i.e., no substantial change in cross-stretch dimensions). The core film may be stretched in the machine direction, as with a length orienter, and in the width direction using a tenter, or at diagonal angles.

It will be understood with respect to such stretching and orientation processes, that the pre-stretch temperature, stretch temperature, stretch rate, stretch ratio, heat set temperature, heat set time, heat set relaxation, and cross-stretch relaxation are selected to yield a film having desired properties, including a desired refractive index relationship. These variables are inter-dependent; thus, for example, a relatively low stretch rate could be used or coupled with, e.g., a relatively low stretch temperature. It will be apparent to one of ordinary skill how to select the appropriate combination of these variables to achieve a desired multilayer device. In general, in the case of multilayer films that are in the form of polarizers, preferred stretch ratios are 1:2–10 (more preferably 1:3–7) along one axis and 1:0.5–1 (more preferably 1:1–7, most preferably 1:3–6) along a second axis. In the case of mirror films, it is generally preferred that the stretch ratio along both axes (which can be the same or different from one another) be in the range of 1:2–10 (more preferably 1:2–8, and most preferably 1:3–7).

In accordance with the invention, a single or multiple layer polymeric core comprises at least one layer of a thermoplastic polymer material wherein dispersed within the thermoplastic material is a particulate pigment. The uniformly-dispersed pigment will be composed of particles that have a mean diameter of between about 10 nm and about 500 nm. The relatively small size of these particles helps to reduce the surface roughness of the overall pigmented film and helps to reduce the amount of internal light scattering, which can deleteriously raise the surface and bulk haze of the film, respectively. Generally, the most readily available and widely used particulate pigments will be conventional carbon blacks, many different grades of which are available commercially. Other useful pigments include the following: inorganic compounds such as oxides, salts and other compounds of iron, titanium, antimony, zirconium, zinc, barium, calcium, cadmium, lead, chromium, molybdenum, manganese, silicon, aluminum, sodium, cobalt, copper, and other metals, such compounds being exemplified by iron oxides, ammonium ferrocyanides (iron blues), titanium dioxides, antimony oxides, zirconium oxides, zirconium silicates, zinc oxides, zinc sulfides, barium sulfates, calcium carbonates, calcium sulfates, cadmium sulfides, cadmium selenides, lead sulfates, chromium oxides, chromates, molybdates, manganates, silica, silicates, aluminosilicates, sodium alumiino sulphosilicates (ultramarines) such as Ultramarine Blue, Ultramarine Violet, and Ultramarine Pink, and other metal oxides, as well as other simple and complex inorganic compounds; inorganic complexes, such as Pigment Blue 28, Cobalt Blue, Cobalt Aluminate, King's Blue, Thenard's Blue, Cadmium Red, Molybdate Orange, Lead Molybdate, Chrome Yellow, Lead Chromates, Chrome Green, Pigment Yellow 53, Titanium Yellow, Nickel Titanate, Nickel Antimony Titanate, Nickel Titanate Yellow, Pigment Violet 16, Manganese Violet, Permanent Violet, Nuremberg Violet, Mineral Violet, and Fast Violet; and organic pigments such as phthalocyanines, copper phthalocyanines, quinacridones, anthraquinones, perylenes, perinones, dioxazines, diketo-pyrrolo-pyrrols (DPPs), indanthrones, benzidines, isoindolines and isoindolinones, benzimidazolones, and azo, disazo, or polyazo pigments (such as Naphthol Red, diarylides, dianisidine, and pyrazolone) including metallized azo pigments (such as Lake Red C, Permanent Red 2B, Nickel Azo Yellow, Lithol Red, and Pigment Scarlet). These various pigments can be used alone or in combination to achieve different tinting tones, absorption profiles, and/or physical properties. The particulate pigment (or pigment blend) should be incorporated within the thermoplastic polymer in proportion to the level of pigmentation, or "tinting," desired for the overall construction. Generally, the particulate pigment will be added to the thermoplastic polymer in an amount between about 0.02 and 0.5 percent by weight, though more or less pigment can be employed depending on the application and depending on the particular pigment chosen.

In certain embodiments, two or more particulate pigments can be used in combination with one another to achieve a desired coloration or to optimally control a neutral color. For example, one or more colored pigments or dyes can be combined to make a construction of a given color (e.g., blue) or, where an optimally neutral coloration is desired, a small amount of one or more colored pigments may be added to correct for slight off-color absorption sometimes associated with the use of single pigments. The latter effect, that of optimizing neutral color, can find particular application for use of carbon black, which, when present at high loadings, can display a yellow tint. While not dependent on any particular theory, it is believed that the off-neutral coloring of single pigments is at least in part dependant upon the dispersed particle size of the pigment. Thus, speaking generally, the larger the particle size of a dispersed pigment, the greater likelihood exists for off-color absorption. It will be understood that where supplemental pigments or dyes are incorporated at levels that do not interfere with the optical properties of the resulting optical bodies, their particle size and character are not critical.

Generally, to be used in the present invention, commercial-sized agglomerates or beads of pigment are reduced to a median diameter of between about 10 and 500 nm. More preferably, the pigments beads are reduced to a diameter of between about 20 and 100 nm. This may be accomplished, for example, by milling the agglomerates in a minimum amount of a solvent, for example ethylene glycol, preferably also in the presence of a dispersing agent such as polyvinylpyrrolidone (PVP). Generally, the dispersant, e.g., the PVP, is added in an amount from about 1 to 30 parts by weight per 100 parts of carbon black.

The particulate pigment dispersion may be incorporated into the thermoplastic polymer material for example by milling the pigment into the polymer using conventional mixing and/or milling equipment. A uniform dispersion of the particulate pigment in the thermoplastic material is, however, more readily achieved by dispersing the pigment into the polymer during polymerization. This allows for the dispersing of the pigment throughout a relatively low viscosity monomer mixture, avoiding the more difficult milling processes. To accomplish this, the particulate pigment can be dispersed into the polymer reactant medium in a suitable solvent, for example, ethylene glycol, with the aid of PVP or other dispersant. This dispersion may also be added to the reaction mass of a condensation polymer-forming process. Useful uniform dispersions of carbon black particles, for example, can be obtained by adding the milled carbon black, ethylene glycol, and dispersant to the polyester reaction mass immediately following the ester interchange step.

A generally preferred method for incorporating the particulate pigment into the pre-polymerized reaction mass is to first create a slurry of the particulate pigment in ethylene glycol. A useful slurry can be created with 10 percent pigment by weight in the ethylene glycol. As noted above, the slurry can also incorporate one or more wetting or dispersing agents, such as PVP. The slurry can be pre-mixed and, after pre-mixing, be passed several times through a media mill. The milled mixture can also be passed through a fine filter (e.g., on the order of 1 micron) to provide additional particle size control. The final mixture can be charged directly to a reaction vessel along with the pre-polymerized condensation polymer forming reaction mass. The resulting polymer typically will be loaded with about 1 percent by weight of the pigment. The high shear mixing both within the mill during mixing and during the polymerization reaction within the reaction vessel can help contribute to the uniformity of the pigment dispersion within the polymer and can help reduce undesired agglomeration of the particles in the polymer resin.

In accordance with the invention, at least one additional layer can also optionally be placed in contact with at least one outer surface of the optical body core containing the pigmented thermoplastic polymer material. This surface layer can act to reduce the surface roughness of the overall construction and maintain the clarity and low haze of the optical body. These surface, or "skin," layers typically are free of the particulate pigment. The skin layer or layers can be coextruded onto one or both outer surfaces of the core optical body. Alternatively, the skin layer or layers can be coated or laminated onto the core body using a suitable pressure sensitive or non-pressure sensitive adhesive. Suitable coatings include, but are not limited to, hardcoats, adhesives, antistatics, adhesion promoting primers, UV stabilizing coatings, etc. One or more additional layers (films, laminates, and/or coatings) can also be incorporated along with the skin layers. The skin layers are preferably made of a transparent polymer, for example, a polyester (the same or different as that used in the construction of the core film), polyolefin, polycarbonate, or other thermoplastic polymer.

Preferred pigmented optical bodies will have a relatively smooth surface and a low haze. A useful indication of the surface character of an optical body is the roughness average, or surface roughness, $R_a$. Such $R_a$ values can be measured, for example, according to ASTM test method F1811-97. The optical bodies of the invention will preferably have a surface roughness, $R_a$, of less than or equal to about 60 nm, more preferably less than or equal to about 30 nm.

Similarly, a useful measure of the "haze" of an optical body can be determined from the percentage of light which, in passing through the body, deviates from the incident beam through forward scatter by more than a specified average degree. ASTM D1003 provides one method for making such a measurement. When the haze of an optical body is determined against light scattering about the surface of body exposed to air, the measured haze includes the haze caused by both surface and internal optical effects. This is considered the "total" haze for the optical body. The optical effects generated by the body itself internally, or "internal" haze, can be determined by measuring the haze of the optical body when it is immersed in a fluid of substantially similar refractive index. Generally, the optical bodies of the invention will exhibit an internal haze of less than about five percent, preferably less than about three percent, and more preferably less than about two percent. Preferred optical bodies will also exhibit a total haze of less than about ten percent, more preferably less than about five percent.

The optical bodies of the invention can be used in any application to provide a stable neutral color tint or a neutral density filter. The optical bodies can incorporate or be applied to other optical bodies or films to combine multiple optical effects. For example, the optical bodies can be incorporated along with one or more additional optically active layers to form an IR mirror, UV absorption construction, solar control construction, polarizer, or decorative construction. Similarly, the pigmented optical bodies of the invention can be used to tint automotive or window glazings, such as glass or polycarbonates. The pigmented optical bodies also find application in the construction of puncture or tear-resistant films, safety and security films, and as contrast enhancement layers for optical displays, for example, computer monitors, television screens, and the like.

The following examples are offered to aid in the understanding of the present invention and are not to be construed as limiting the scope thereof. Unless otherwise indicated, all parts and percentages are by weight.

EXAMPLES

Particle Dispersion A

In a 210 liter, 94.59% by weight of ethylene glycol and 0.43% by weight CoPVP (polyvinylpyrrolidone) wetting agent were intensively mixed for about 60 minutes using a high speed, high shear Cowles "Dissolver" mixer equipped with a 25 cm. diameter mixing blade. While continuing to mix, 4.98% by weight gas black (specifically Degussa FW200 which is said to have 13 nm particle size) were slowly added to the ethylene glycol mixture. After one hour at 1700 rpm, the mixture was pumped at 1 liter per minute through a high shear, (13 liter, Netzch horizontal) sand mill containing a 50%, by volume, loading of uniform 4.75 mm stainless steel beads and shaft rpm of 900. The mixture was passed through the mill 5 times, 3 passes through the mill provided a uniform dispersion of carbon black particles. The dispersion was passed through a 3-micron cartridge filter. The finished dispersion was held in a vessel equipped with low speed agitation from a Cowles Dissolver until ready for addition to the reactor. Analysis with Hegman Gauge and light microscopy indicated that the dispersion was free of agglomerations larger than 1 micron, Microtrac™ particle analyzer indicated that the volume fraction average particle/agglomerate size in the dispersion was less than 200 nm.

Particle Dispersion B

In a 210 liter tank, 49.86% by weight of ethylene glycol and 0.20% by weight CoPVP (polyvinylpyrrolidone) wetting agent were intensively mixed for about 60 minutes using a high speed, high shear Cowles "Dissolver" mixer equipped with a 25cm. diameter mixing blade. While continuing to mix, 4.99% by weight surface treated furnace black (specifically Cabot Black Pearls 1300, with a stated 13 nm particle size, 560 $m^2/g$ of surface area per nitrogen absorption) were slowly added to the ethylene glycol mixture. After one hour at 1700 rpm, another 44.87% by weight ethylene glycol and 0.09% by weight CoPVP were added to reduce the viscosity of the mixture. This was intensively mixed in the Dissolver at 1500 rpm for another 60 min. After thinning the slurry, the mixture was pumped at 1 liter per minute through a high shear, (22 liter, Netzch horizontal) sand mill containing a 50%, by volume, loading of uniform 0.8–1.0 mm ceramic beads and shaft rpm of 1300. The mixture was passed through the mill 8 times, 5 passes through the mill provided a uniform dispersion of carbon black particles. The dispersion was passed through a I-micron cartridge filter. The finished dispersion was held in a vessel equipped with low speed agitation from a Cowles Dissolver until ready for addition to the reactor. Analysis with Hegman Gauge and light microscopy indicated that the dispersion was free of agglomerations larger than 1 micron, Microtrac™ particle analyzer indicated that the volume fraction average particle/agglomerate size in the dispersion was less than 500 nm.

Particle Dispersion C

In a 19 Liter tank, 100 parts by weight of ethylene glycol and 0.40 parts by weight PVP (polyvinylpyrrolidone) wetting agent were intensively mixed for about 60 minutes using a high speed, high shear Cowles "Dissolver" mixer equipped with a 10 cm. diameter mixing blade. While continuing to mix, 10.0 parts by weight copper phthalocyanine pigment (specifically BASF Heliogen™ Blue L 6930, which is said to have a specific surface of 81 $m^2/g$) was slowly added to the ethylene glycol mixture. After one hour at 1700 rpm, the mixture was poured into a ceramic 7.5-liter ball mill. The mill, which was ¾ full of 10 mm zirconium beads, was rotated for 62 hours to obtain a uniform dispersion of the pigment. The finished dispersion was held in a vessel equipped with low speed agitation from a Cowles Dissolver until ready for addition to the reactor. Analysis with light microscopy indicated that the dispersion was free of agglomerates larger than about 1 micron.

Particle Dispersion D

In a 210 liter tank, 91.42% by weight of ethylene glycol and 1.7% by weight PVP (polyvinylpyrrolidone) wetting agent were intensively mixed for about 30 minutes using a high speed, high shear Cowles "Dissolver" mixer equipped with a 25 cm diameter mixing blade. While continuing to mix, 6.9% by weight gas black (specifically Degussa FW200 which is said to have 13 nm particle size) was slowly added to the ethylene glycol mixture. After one-half hour at 1700 rpm, the mixture was pumped at 1 L/min through a high shear, (13 liter, Netzch horizontal) sand mill containing a 52%, by volume, loading of uniform 4.75 mm stainless steel beads and shaft rpm of 1460. The mixture was passed through the mill 7 times; 5 passes through the mill provided a uniform dispersion of carbon black particles. The dispersion was passed through a 1-micron cartridge filter, and the finished dispersion was held in a vessel equipped with low speed agitation from a Cowles Dissolver until ready for addition to the reactor. Analysis with Hegman Gauge and light microscopy indicated that the dispersion was free of agglomerations larger than 1 micron. A Microtrac™ particle analyzer indicated that the volume fraction average particle/agglomerate size in the dispersion was about 175 nm.

Particle Dispersion E

In a 210 liter tank, 84.37% by weight of ethylene glycol and 1.18% by weight PVP (polyvinylpyrrolidone) wetting agent were intensively mixed for about 30 minutes using a high speed, high shear Cowles "Dissolver" mixer equipped with a 25 cm diameter mixing blade. While continuing to mix, 14.4% by weight Pigment Blue 60 (specifically BASF Paliogen™ Blue L6495F with a specific surface area of about 80m²/g) was slowly added to the ethylene glycol mixture. After one-half hour at 1700 rpm, the mixture was pumped at 1 L/min through a high shear, (13 liter, Netzch horizontal) sand mill containing a 52%, by volume, loading of uniform 4.75 mm stainless steel beads and shaft rpm of 1460. The mixture was passed through the mill 5 times, and the dispersion was passed through a 5-micron cartridge filter. The filter effectively removed many of the larger pigment agglomerates reducing the pigment level of the final mixture to 10.73% by weight. The finished dispersion was held in a vessel equipped with low speed agitation from a Cowles Dissolver until ready for addition to the reactor. Analysis with Hegman Gauge and light microscopy indicated that the dispersion was mostly free of agglomerations larger than 1 micron. A Microtrac™ particle analyzer indicated that the volume fraction average particle/agglomerate size in the dispersion was less than 900 nm.

Particle Dispersion F

In a 210 liter tank, 65.7% of Particle Dispersion D and 34.3% of Particle Dispersion E were intensively mixed for about 30 minutes using a high speed, high shear Cowles "Dissolver" mixer equipped with a 25 cm diameter mixing blade. Then the mixture was pumped at 1 L/min through a high shear, (13 liter, Netzch horizontal) sand mill containing a 52%, by volume, loading of uniform 4.75 mm stainless steel beads and shaft rpm of 1460. The mixture was passed through the mill 1 time and then filtered through a 5-micron absolute filter. The finished dispersion was held in a vessel equipped with low speed agitation from a Cowles Dissolver until ready for addition to the reactor. Analysis with Hegman Gauge and light microscopy indicated that the dispersion was mostly free of agglomerations larger than 1 micron. A Microtrac™ particle analyzer indicated that the volume fraction average particle/agglomerate size in the dispersion was less than 450 nm.

Masterbatch A1

Into a 380 liter reactor equipped with a turbine agitator and a hot oil jacket were charged 100 parts by weight of dimethyl terephthalate, 62.32 parts of ethylene glycol, 0.02 parts cobalt acetate, 0.02 parts zinc acetate, 0.03 parts antimony acetate, and 4 parts of Particle Dispersion A. While agitating at a pressure of 138 kPa, the batch temperature was gradually raised to 249° C., while fractionating off 33 parts by weight of methanol. When the batch reached 255° C., over a period of ten minutes, the kettle pressure decreased to 101.3 kPa. The reactor was isolated and 0.039 parts triethyl phosphonoacetate was added and allowed to mix for five minutes. The reactor contents were transferred to a 380-liter polymerization vessel equipped with an anchor agitator and a hot oil jacket, and the solution temperature was adjusted to 198° C. The solution temperature was increased to 260° C. at 0.6° C. per minute to remove excess ethylene glycol. At 260° C. the vessel pressure was reduced to 0.133 kPa or less over a 20-minute period while the solution temperature was raised to 285° C. The mixture polymerized under these conditions to an intrinsic viscosity of 0.59 in trifluoroacetic acid. It was drained from the reactor using nitrogen pressure through a strand die, quenched with room temperature water in a water bath, and cut into chips.

Masterbatch A2

Into a 380 liter reactor equipped with a turbine agitator and a hot oil jacket were charged 100 parts by weight of dimethyl terephthalate, 55.12 parts of ethylene glycol, 0.02 parts cobalt acetate, 0.02 parts zinc acetate, 0.03 parts antimony acetate, and 16 parts of Particle Dispersion A. While agitating at a pressure of 138 kPa, the batch temperature was gradually raised to 249° C., while fractionating off 33 parts by weight of methanol. When the batch reached 255° C., over a period of ten minutes, the kettle pressure decreased to 101.3 kPa. The reactor was isolated and 0.039 parts triethyl phosphonoacetate was added and allowed to mix for five minutes. The reactor contents were transferred to a 380-liter polymerization vessel equipped with an anchor agitator and a hot oil jacket, and the solution temperature was adjusted to 198° C. The solution temperature was increased to 260° C. at 0.6° C. per minute to remove excess ethylene glycol. At 260° C. the vessel pressure was reduced to 0.133 kPa or less over a 20-minute period while the solution temperature was raised to 285° C. The mixture polymerized under these conditions to an intrinsic viscosity of 0.59 in trifluoroacetic acid. It was drained from the reactor using nitrogen pressure through a strand die, quenched with room temperature water in a water bath, and cut into chips.

Masterbatch B

Into a 380-liter reactor equipped with a turbine agitator and a hot oil jacket were charged 100 parts by weight of dimethyl terephthalate, 70.32 parts of ethylene glycol, 0.053 parts cobalt acetate, and 0.03 parts antimony acetate. While agitating at a pressure of 138kPa, the batch temperature was gradually raised to 249° C., while fractionating off 33 parts by weight of methanol. When the batch reached 255° C., over a period of ten minutes, the kettle pressure decreased to 101.3 kPa. The reactor was isolated and 0.053 parts triethyl phosphonoacetate and 16 parts of Particle Dispersion B was added and allowed to mix for five minutes. The reactor contents were transferred to a 380-liter polymerization vessel equipped with an anchor agitator and a hot oil jacket, and the solution temperature was adjusted to 198° C. The solution temperature was increased to 260° C. at 0.6° C. per minute to remove excess ethylene glycol. At 260° C. the vessel pressure was reduced to 0.133 kPa or less over a 20-minute period while the solution temperature was raised to 285° C. The mixture polymerized under these conditions to an intrinsic viscosity of 0.59 in trifluoroacetic acid. It was drained from the reactor using nitrogen pressure through a strand die, quenched with room temperature water in a water bath, and cut into chips.

Masterbatch C

Into a 38-liter reactor equipped with a turbine agitator and a hot oil jacket were charged 100 parts by weight of dimethyl terephthalate, 70 parts of ethylene glycol, 0.02 parts cobalt acetate, 0.02 parts zinc acetate, 0.03 parts antimony acetate, and 8 parts Particle Dispersion C. While agitating at a pressure of 138 kPa, the batch temperature was gradually raised to 249° C., while fractionating off 33 parts by weight of methanol. When the batch reached 255° C., over a period of ten minutes, the kettle pressure decreased to 101.3 kPa. The reactor was isolated and 0.039 parts triethyl phosphonoacetate was added and allowed to mix for five minutes. The solution temperature was increased to 260° C. at 0.6° C. per minute to remove excess ethylene glycol. At 260° C. the vessel pressure was reduced to 0.133 kPa or less over a 20-minute period while the solution temperature was raised to 285° C. The mixture polymerized under these conditions to an intrinsic viscosity of 0.59 in trifluoroacetic acid. It was drained from the reactor using nitrogen pressure into trays, cooled with air, and the resulting slabs were ground in an impact rotary grinder.

Masterbatch D

Into a 380-liter reactor equipped with a turbine agitator and a hot oil jacket were charged 100 parts by weight of dimethyl terephthalate, 68:8 parts of ethylene glycol, 0.025 parts cobalt acetate, 0.025 parts zinc acetate, and 0.03 parts antimony acetate. While agitating at a pressure of 1 38kPa, the batch temperature was gradually raised to 249° C., while fractionating off 33 parts by weight of methanol. When the batch reached 255° C., over a period of ten minutes, the kettle pressure decreased to 101.3 kPa. The reactor was isolated and 0.050 parts triethyl phosphonoacetate and 11.6 parts of Particle Dispersion F was added and allowed to mix for five minutes. The reactor contents were transferred to a 380-liter polymerization vessel equipped with an anchor agitator and a hot oil jacket, and the solution temperature was adjusted to 198° C. The solution temperature was increased to 260° C. at 0.6° C. per minute to remove excess ethylene glycol. At 260° C. the vessel pressure was reduced to 0.133 kPa or less over a 20-minute period while the solution temperature was raised to 285° C. The mixture polymerized under these conditions to an intrinsic viscosity of 0.59 in trifluoroacetic acid. It was drained from the reactor using nitrogen pressure through a strand die, quenched with room temperature water in a water bath, and cut into chips.

Film Process A1

Into an extruder was fed a blend ranging from 90 parts polyethylene terephthalate and 10 parts of a Masterbatch to 0 parts polyethylene terephthalate and 100 parts of a Masterbatch A1, as indicated in the tables of examples. While heated to 282° C., the contents were passed through 40 micrometer sintered metal filters, and fed through a drop die to provide a single polyester sheet. The sheet was about 0.23 mm in thickness and about 34 cm wide. After being quenched on a water-cooled casting roll, the sheet was biaxially oriented about 3.5 times in each direction and heat set at 204° C. to provide a film base about 0.025 mm in thickness.

Film Process A2

Into an extruder was fed a blend ranging from 90 parts polyethylene terephthalate and 10 parts of a Masterbatch to 0 parts polyethylene terephthalate and 100 parts of a Masterbatch, as indicated in the tables of examples. Into a second extruder were fed 50 parts of polyethylene terephthalate. While heated to 282° C., the contents of the first extruder were passed through 40 micrometer sintered metal filters, and the extrudate from the second extruder was split into two streams. The three streams were simultaneously fed through a drop die to provide a single 3-layer polyester sheet, the central layer of which contained Masterbatch A1 or A2 and polyethylene terephthalate and the outer layers of which contained polyethylene terephthalate. Each of the outer layers was about 0.064 mm in thickness and the inner layer was about 0.25 mm in thickness. The width of the 3-layer sheet was about 35 cm. After being quenched on a water-cooled casting roll, the sheet was biaxially oriented about 3.5 times in each direction and heat set at 204° C. to provide a film base about 0.038 mm in thickness.

Film Process B1

Into a first extruder was fed a blend ranging from 93 parts of polyethylene terephthalate and 7 parts of Masterbatch B to 90 parts of polyethylene terephthalate and 10 parts of Masterbatch B. Into a second extruder were fed 100 parts of polyethylene terephthalate (see table of examples). While heated to 277° C., the contents of both extruders were passed through 7 micrometer pleated metal filters. The two streams were simultaneously fed through a drop die to provide a single 2-layer polyester sheet, the first layer of which contained Masterbatch B and polyethylene terephthalate and the second layer of which contained polyethylene terephthalate. Each layer was about 0.62 mm in thickness, and the width of the 2-layer sheet was about 45 cm. After being quenched on a water-cooled casting roll, the sheet was biaxially oriented about 3.5 times in each direction and heat set at 232° C. to provide a film base about 0.10 mm in thickness.

Film Process B2

Into a first extruder was fed a blend ranging from 93 parts of polyethylene terephthalate and 7 parts of Masterbatch B to 0 parts of polyethylene terephthalate and 100 parts of Masterbatch B. Into a second extruder were fed 50 parts of polyethylene terephthalate (see table of examples). While heated to 277° C., the contents of both extruders were passed through 7 micrometer pleated metal filters. The two streams were simultaneously fed through a drop die to provide a single 2-layer polyester sheet, the first layer of which contained Masterbatch B and polyethylene terephthalate and the second layer of which contained polyethylene terephthalate. The first layer was about 0.23 mm in thickness, the second layer was about 0.077 mm in thickness, and the width of the 2-layer sheet was about 43 cm. After being quenched on a water-cooled casting roll, the sheet was biaxially oriented about 3.5 times in each direction and heat set at 232° C. to provide a film base about 0.025 mm in thickness.

Film Process C

Into an extruder was fed a blend ranging from 100 parts polyethylene terephthalate and 0 parts Masterbatch C to 100 parts polyethylene terephthalate and 200 parts Masterbatch C (see table of examples). While heated to 282° C., the contents were passed through a 25mm twin screw extruder, and fed through a drop die to provide a single polyester sheet. The sheet was about 0.55 mm in thickness and about 30 cm wide. This sheet was quenched on a water-cooled casting roll.

This sheet cut into 75mm×75mm samples was held on all four sides by nitrogen powered clips in a servo hydraulic type lab stretcher and heated to 90° C. for 60 seconds. The film was then biaxially oriented 3.3 in the first direction and 4.0 in the second to produce a film 0.043 mm in thickness Film Process D Into a first extruder was fed 100 parts of polyethylene terephthalate. Into a second extruder was fed a blend of 94.3 parts of polyethylene and 5.7 parts of Masterbatch D. While heated to 277° C., the contents of both extruders were passed through 20 micrometer pleated metal filters. The two streams were simultaneously fed through a drop die to provide a single 2-layer polyester sheet, the first layer of which contained polyethylene terephthalate and the second layer of which contained polyethylene terephthalate and Masterbatch D. Both layers were about 1.17 mm in thickness, and the width of the 2-layer sheet was about 100 cm. After being quenched on a water-cooled casting roll, the sheet was biaxially oriented about 3.5 times in each direction and heat set at 232° C. to provide a film base about 0.18 mm in thickness.

Testing Methods

The Microtrac™ 7995–00 Particle Size Analyzer was used to analyze carbon black particles larger than 120 nm in the ethylene glycol dispersion. This Analyzer generates a volume average distribution of particle size.

Hegman-Type Gage determined the degree of dispersion (commonly referred to as "fineness of grind") of the carbon black in ethylene glycol. It also was used to assess the inclusion of particulates by a cleanliness (or texture) rating.

Light microscopy was also used to observe the quality of the carbon black ethylene glycol dispersion. The degree of particle flocculation was observed under no shear conditions.

A Gardner PG-5500 Digital Photometric Unit and a Gardner XL211 Hazegard™ System were used according to ASTM D1003 to measure total haze. Total haze is the "percent of total transmitted light which, in passing through the specimen deviated from the incident beam through forward scatter by more than 0.044 rad (2.5°) on average. The Gardner PG-5500 was also used, in conjunction with an index matching fluid, to measure internal haze. The difference between total haze and internal haze is the surface haze.

Caliper was measured with the Measuretech series 2000 capacitance thickness gauge.

Percent transmission was measured by a spectrophotometer and integrated over the visible spectrum, 400–700nm.

Surface roughness, $R_a$, was measured according to ASTM F 1811-97 by a Veeco Wyko NT3300 equipped with the RST Plus surface profiling system. The RST Plus is a non-contact optical profiler that uses two technologies to measure a wide range of surface heights. Phase-shifting interferometry (PSI) measures smooth surfaces while vertical-scanning interferometry (VSI) mode measures rough surfaces. $R_a$ values are presented in units of nanometers.

Particulate pigment loading is calculated for only the pigmented layer, and not necessarily for the total construction. Particulate pigment loading as reported in the following examples is calculated by the following equation:

$$X_P = \frac{(X_{P,MB} * W_{MB})}{(W_{MB} + W_A)}$$

where: $X_P$ is the weight fraction of particulate in the pigmented layer, referred to as "Particulate Loading" in the Examples.

$X_{P,MB}$ is the weight fraction of particulate pigment in the Masterbatch.

$W_{MB}$ is the flow rate, in kg/hr, of Masterbatch in the pigmented layer.

$W_A$ is the flow rate, in kg/hr, of base material in the pigmented layer.

Examples 1–3

Examples in Table 1 were produced by Film Process A1.

TABLE 1

| Example | Master-batch | Particulate Loading (Mass Fraction) | Transmission (%) | Internal Haze (%) | Total Haze (%) | $R_a$ (nm) |
|---|---|---|---|---|---|---|
| 1 | A1 | 0.0010 | 66 | 0.9 | 2.7 | 14.18 |
| 2 | A1 | 0.0015 | 58 | 1.1 | 3.5 | — |
| 3 | A2 | 0.0024 | 43 | 1.1 | 4.8 | — |

Examples 4–6

Examples in Table 2 were produced by Film Process A2.

TABLE 2

| Example | Master-batch | Particulate Loading (Mass Fraction) | Transmission (%) | Internal Haze (%) | Total Haze (%) | $R_a$ (nm) |
|---|---|---|---|---|---|---|
| 4 | A1 | 0.0002 | 80 | 0.7 | 1.2 | — |
| 5 | A1 | 0.0015 | 57 | 1.1 | 2.4 | — |
| 6 | A2 | 0.0016 | 47 | 0.2 | 1.5 | 4.68 |

Examples 7–8

Examples in Table 3 were produced by Film Process B1.

TABLE 3

| Example | Master-batch | Particulate Loading (Mass Fraction) | Transmission (%) | Total Haze (%) | $R_a$ Pigmented Side (nm) | $R_a$ Skin Side (nm) |
|---|---|---|---|---|---|---|
| 7 | B | 0.0008 | 51.74 | 1.1 | 5.83 | 0.69 |
| 8 | B | 0.0006 | 60.39 | 1.0 | — | — |

Figure 2:
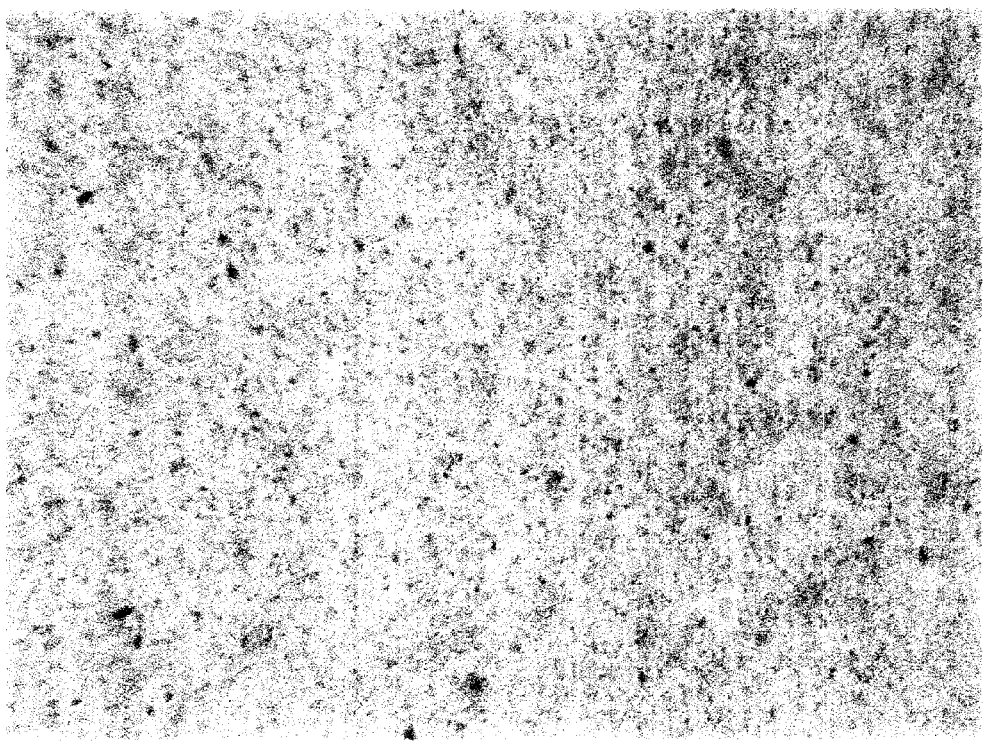
FIG. 2 is a photomicrograph of a pigmented optical body made in accordance with the invention.

FIG. 2 shows a photomicrograph, at 320X, of the film of Example 7.

Examples 9–12

Examples in Table 4 were produced by Film Process B2.

TABLE 4

| Example | Master-batch | Particulate Loading (Mass Fraction) | Transmission (%) | Total Haze (%) | $R_a$ Pigmented Side (nm) | $R_a$ Skin Side (nm) |
|---|---|---|---|---|---|---|
| 9 | B | 0.0006 | 76.17 | 0.78 | 61.96 | 8.32 |
| 10 | B | 0.0017 | 58.91 | 1.14 | — | — |
| 11 | B | 0.0040 | 31.09 | 1.60 | — | — |
| 12 | B | 0.0080 | 12.95 | 1.22 | — | — |

FIG. 1 shows the transmission spectra for the film of Example 11 and the conventional dyed PET film.

Examples 13–14

Examples in Table 5 were produced by Film Process C.

TABLE 5

| Example | Masterbatch | Particulate Loading (Mass Fraction) | Transmission (%) | Total Haze |
|---|---|---|---|---|
| 13 | C | 0.0057 | 78.55 | 1.00 |
| 14 | C | 0.0385 | 59.81 | 4.50 |

Example 15

Example in Table 6 was produced by Film Process D.

TABLE 6

| Example | Masterbatch | Particulate Loading (Mass Fraction) | Transmission (%) | Total Haze |
|---|---|---|---|---|
| 15 | F | 0.00027 | 60.1 | 0.8 |

Various modifications and alterations of this invention will be apparent to those skilled in the art without departing from the scope and spirit of this invention, and it should be understood that this invention is not limited to the illustrative embodiments set forth herein.

What is claimed is:

1. An optical body, comprising:
   a single or multiple layer core comprising at least one layer of an oriented thermoplastic polymer material; and
   a particulate pigment dispersed in the at least one layer;
   wherein the particulate pigment is present in an amount sufficient to provide the optical body with: (a) a transmission of light within a wavelength band of interest within the visible spectrum of from about 10 to about 80 percent, and (b) an internal haze of less than or equal to about five percent; and
   wherein the optical body is a tinted film suitable for application to a base substrate.

2. The optical body of claim 1 further comprising at least one additional layer that is substantially free of particulate pigmentation.

3. The optical body of claim 2 wherein said additional layer is a transparent coating, laminate or film.

4. The optical body of claim 2 wherein said additional layer comprises an oriented film.

5. The optical body of claim 1 wherein said optical body exhibits less than about three percent internal haze.

6. The optical body of claim 1 wherein said optical body exhibits less than about two percent internal haze.

7. The optical body of claim 1 wherein said optical body has a total haze of less than about ten percent.

8. The optical body of claim 1 wherein said optical body has a surface roughness, Ra, of less than or equal to about 60 nm.

9. The optical body of claim 1 wherein said particulate pigment comprises carbon black.

10. The optical body of claim 1 wherein said particulate pigment comprises a material selected from the group consisting of oxides, salts and compounds of iron, titanium, antimony, zirconium, zinc, barium, calcium, cadmium, lead, chromium, molybdenum, manganese, silicon, aluminum, sodium, cobalt, copper, iron oxides, ammonium ferrocyanides, titanium dioxides, antimony oxides, zirconium oxides, zirconium silicates, zinc oxides, zinc sulfides, barium sulfates, calcium carbonates, calcium sulfates, cadmium sulfides, cadmium selenides, lead sulfates, chromium oxides, chromates, molybdates, manganates, silica, silicates, aluminosilicates, sodium alumino sulphosilicates, simple and complex inorganic compounds and inorganic complexes, phthalocyanines, copper phthalocyanines, quinacridones, anthraquinones, perylenes, perinones, dioxazines, diketo-pyrrolo-pyrrols (DPPs), indanthrones, benzidines, isoindolines and isoindolinones, benzimidazolones, azo, disazo, or polyazo pigments, and blends or mixtures thereof.

11. The optical body of claim 1 wherein said thermoplastic polymer material has dispersed within it two or more particulate pigments.

12. The optical body of claim 1 wherein said thermoplastic polymer material has dispersed within it carbon black and at least one blue pigment or dye.

13. The optical body of claim 1 wherein said thermoplastic polymer material comprises a condensation polymer.

14. The optical body of claim 1 wherein said thermoplastic polymer material comprises a polyester.

15. The optical body of claim 1 wherein said thermoplastic polymer material comprises a polyester comprising terephthalate monomer units.

16. The optical body of claim 1 wherein said thermoplastic polymer material comprises a polyester comprising naphthalate monomer units.

17. The optical body of claim 1 wherein said thermoplastic polymer material comprises a polyester selected from the group consisting of polyethylene naphthalate, polyethylene terephthalate, polycarbonates, polyarylates, polybutylene naphthalate, polypropylene naphthalate, polybutylene terephthalate, polypropylene terephthalate, and blends and copolymers of any of the above with each other or with other polymers.

18. The optical body of claim 1 wherein said single or multiple layer core comprises a multilayer optical film.

19. The optical body of claim 1 wherein said additional layer comprises a multilayer optical film.

20. An article comprising the pigmented optical body of claim 1.

21. An infrared mirror comprising the pigmented optical body of claim 1.

22. A window glazing film comprising the pigmented optical body of claim 1.

23. A puncture resistant film comprising the pigmented optical body of claim 1.

24. A solar control film comprising the pigmented optical body of claim 1.

25. A security film comprising the pigmented optical body of claim 1.

26. A contrast enhancement film comprising the pigmented optical body of claim 1.

27. A display device comprising the optical body of claim 1.

28. A traffic sign comprising the optical body of claim 1.

29. The optical body of claim 1, wherein the particulate pigment is dispersed within the polymer material at a concentration between 0.01 and about 1.0 percent by weight, and wherein the particulate pigment has a mean diameter of between about 10 nm and 500 nm.

* * * * *